Figure 1:
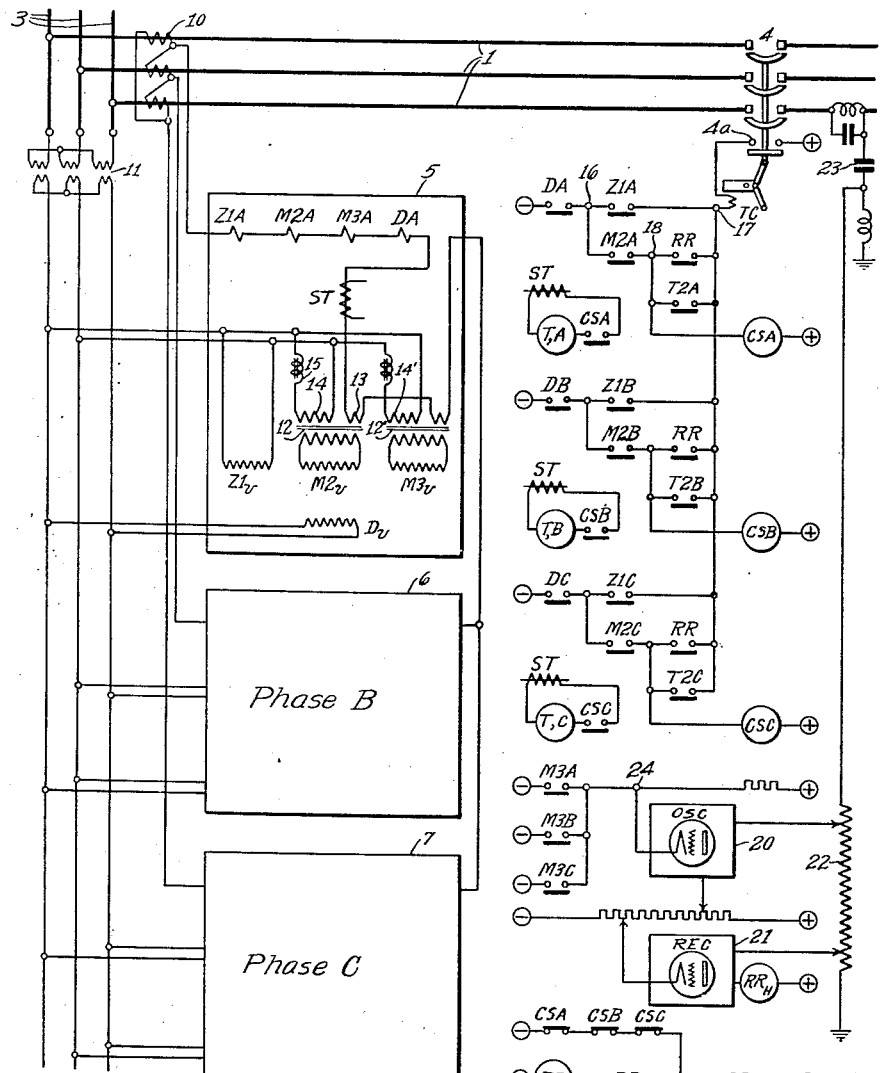

Oct. 9, 1945.  S. L. GOLDSBOROUGH  2,386,209
MODIFIED-IMPEDANCE CARRIER RELAY
Filed Dec. 8, 1943  3 Sheets-Sheet 1

WITNESSES:
C. J. Welles.
Nw. C. Groome

INVENTOR
Shirley L. Goldsborough.
BY O. B. Buchanan
ATTORNEY

Oct. 9, 1945.  S. L. GOLDSBOROUGH  2,386,209
MODIFIED-IMPEDANCE CARRIER RELAY
Filed Dec. 8, 1943      3 Sheets-Sheet 2

WITNESSES:

INVENTOR
Shirley L. Goldsborough.
BY
ATTORNEY

Patented Oct. 9, 1945

2,386,209

UNITED STATES PATENT OFFICE 2,386,209

MODIFIED-IMPEDANCE CARRIER RELAY

Shirley L. Goldsborough, Basking Ridge, N. J., assignor to Westinghouse Electric Corporation, East Pittsburgh, Pa., a corporation of Pennsylvania Application December 8, 1943, Serial No. 513,356

10 Claims. (Cl. 175—294)

My invention relates to improvements utilizing modified-impedance units of various kinds, in connection with protective relaying systems for protecting alternating-current transmission-lines against faults. The invention was first made for the purpose of protecting long three-phase transmission lines against faults and against surge-swings beyond the angle from which recovery is impossible, while avoiding tripping operations in response either to power-load conditions or on synchronizing surges which are obtained after an external fault has been cleared, when the phase-angle between the generated voltages at the two ends of the protected line has not become so great that recovery of synchronism will be impossible. Many features of the invention are of generally utility, however, in connection with shorter lines, or lines in which the charging current is small.

An object of my invention is to provide new and useful combinations of relaying elements, at least one of which is a modified impedance element, the characteristic circle of which has a specially designed center and a specially designed radius, when plotted on coordinates expressing resistance and reactance of the line, expressed in any convenient units, such as ohms, or percentages of the total impedance of the protected line-section, or percentages of the total reactance of the protected line-section.

A further object is to provide two or more impedance-relays, one or more of which have modified impedance-characteristics, said relays having finite-radius response-circles which overlap each other, for jointly defining the zone of line-impedance during which instantaneous or immediately acting tripping is obtained, or for jointly initiating carrier-current transmission, the jointly defined response-area or zone being elongated in the direction of the farthest line-fault impedance.

A further object of the invention is to provide a novel form of carrier-current initiation utilizing a modified-reactance relay characteristic having a center in or near the negative portion of the line-impedance line, and having a radius such that the response-circle of the relay passes through or near the origin.

A still further object of the invention is to provide two modified-impedance elements having circles which overlap in such manner as to have a common chord along the line of, or close to, the line which represents the fault-impedance in a resistance-reactance diagram in which the resistances and reactances are plotted as percentages of the total resistance and reactance, respectively, of the protected line-section. Such a pair of modified-impedance elements, according to my invention, can be utilized either for defining the tripping zone, with the aid of suitable directional elements, or for carrier-current initiation, or for both of these functions.

A further object is to provide a novel form of ground-preference relaying which is adapted to a system using my directional phase-fault detector.

Figure 2:
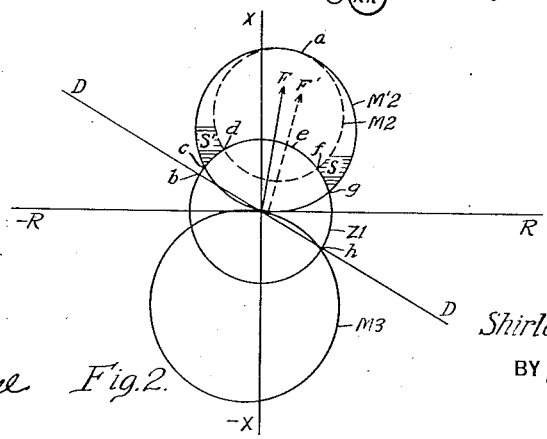
Figure 3:
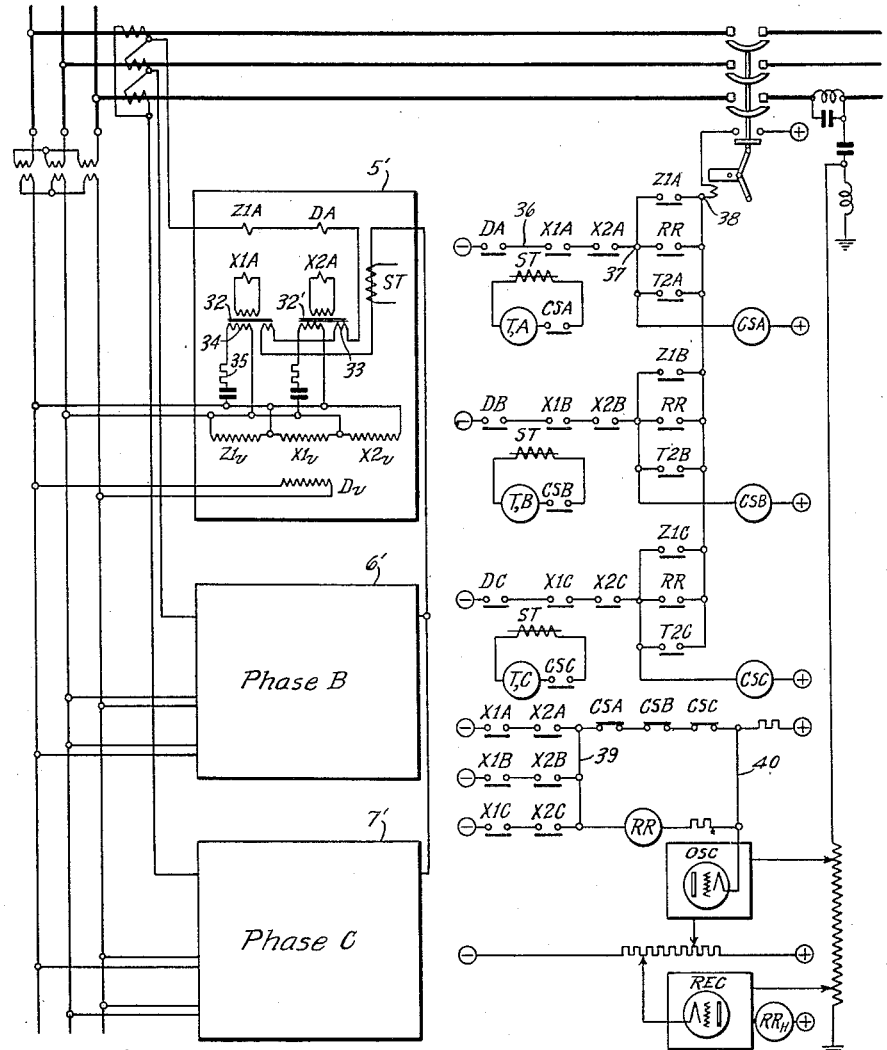
Figure 4:
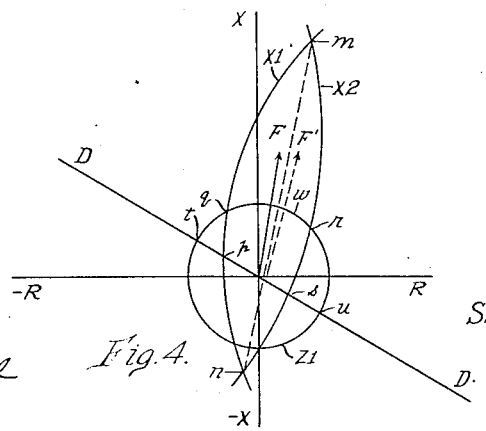
Figure 5:
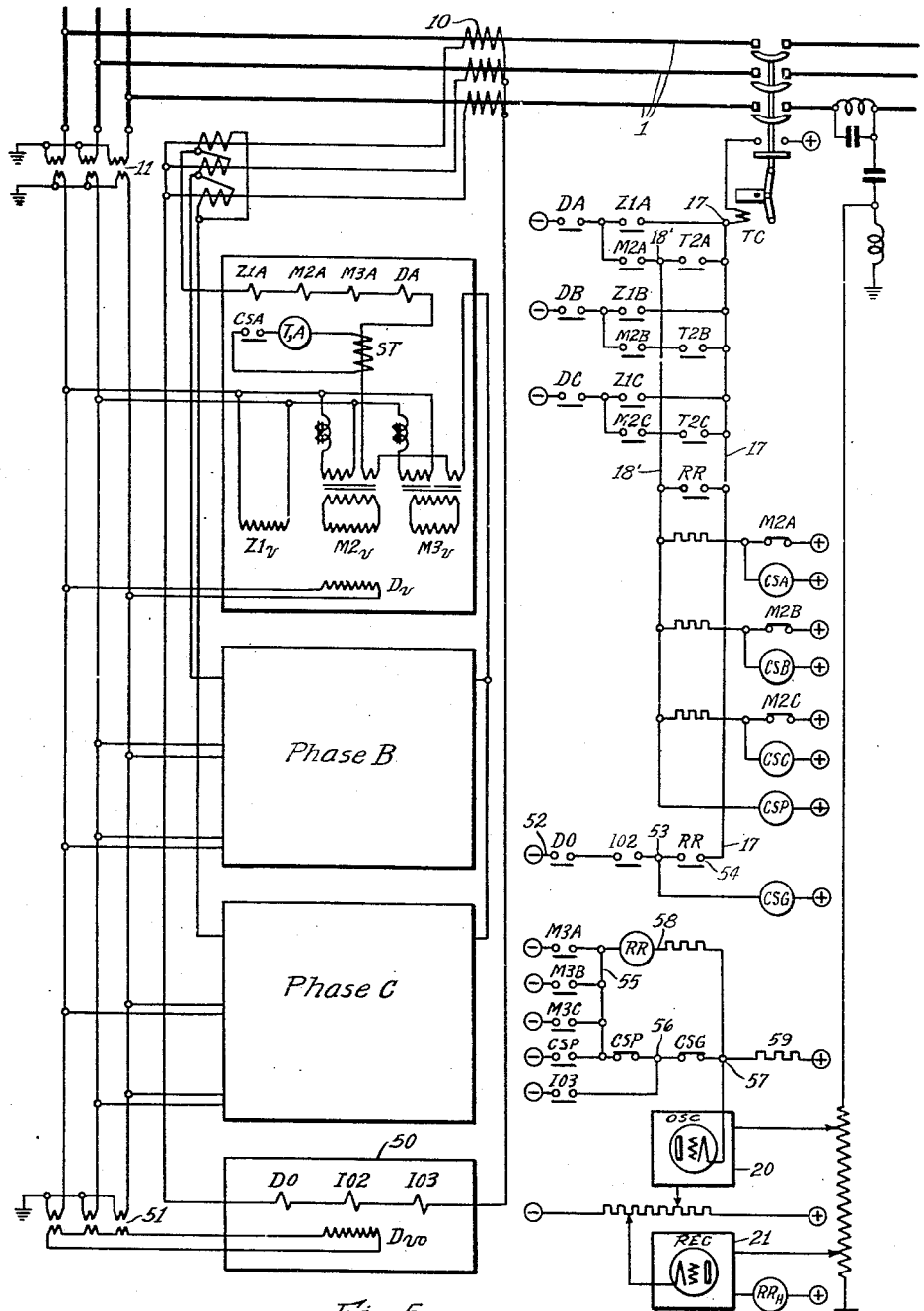

With the foregoing and other objects in view, my invention consists in the circuits, systems, combinations, assemblies, elements, parts and methods hereinafter described, and illustrated in the accompanying drawings, wherein:

Figure 1 is a diagrammatic view of circuits and apparatus embodying my invention in an illustrative form of embodiment, Fig. 2 is an impedance curve diagram illustrative of the apparatus shown in Fig. 1, Fig. 3 is a view similar to Fig. 1, showing another illustrative form of embodiment of my invention, Fig. 4 is an impedance curve diagram illustrative of the apparatus shown in Fig. 3, and Fig. 5 is a view similar to Fig. 1, showing a further modification, which embodies ground-preference.

Fig. 1 illustrates one terminal of a protected three-phase line-section 1, which is a part of a 60-cycle transmission line or system which is connected to a bus 3 at the illustrated terminal. The protected line-section 1 is provided with a three-phase line-segregating circuit-breaker 4, which is illustrated as having an auxiliary make-switch 4a, and having a trip-coil TC. Since the protective equipments at both terminals of the protected line-section 1 are, or may be, identical, an illustration and description of one terminal equipment will suffice.

The protective relaying equipment, as illustrated in Fig. 1, comprises phase-relays 5, 6, and 7, for the three phases A, B, and C of the line. Since the three phase-relays 5, 6, and 7 are similar, a detailed illustration and description of the phase-A relays 5 will suffice for all three.

Line-responsive relaying currents and voltages are provided by means of line-current transformers 10 and potential transformers 11.

The relaying equipment is illustrated as comprising three directionally responsive elements D, which are distinguished by the additional letters A, B, and C for distinguishing between the three line-phases A, B, and C, respectively. The relaying system which is illustrated in Fig. 1 further comprises first-zone phase-fault distance-responsive elements which are illustrated as impedance-elements Z1A, Z1B, and Z1C, for the three phases.

In accordance with the present invention, the several phase-fault relaying elements or panels 5, 6, and 7 of Fig. 1 also include modified impedance-elements such as the phase-A elements M2A and M3A. The element M2A performs functions similar to those heretofore performed by second-zone impedance-elements, while the element M3A performs the carrier-starting function which has commonly heretofore been performed by the third-zone impedance-element.

The modified impedance-elements M2 and M3 of Fig. 1 are illustrated as mho-measuring elements (as indicated by the letter M) in which the restraining force is responsive to the vectorial sum of current and voltage, with a suitable phase-angle between them, while the operating force is responsive to current alone, as described in my application Serial No. 504,695, filed October 2, 1943, although there are other ways in which similar responses may be obtained.

The operating coils and the contacts of the various relays are designated by the letters which constitute the relay-designation, so that the relay-designation is sufficient to indicate both the operating-coils and the contacts of the various relays, the relays being illustrated in their unenergized positions.

In Fig. 1, the phase-A directional element DA is provided with an operating coil DA which is excited in response to the difference between the phase-A and phase-B line-currents $I_A-I_B$, or the delta-current $I_{AB}$. The directional element DA is also provided with a voltage-responsive polarizing coil $D_V$, which is energized from the potential-transformer 11 so as to be responsive to the delta line-voltage $E_{AC}$. The operating coil of the first-zone impedance relay Z1A is energized in series with the DA coil, so as to be likewise responsive to the delta line-current $I_{AB}$, and this impedance relay is provided with a voltage-responsive restraint-coil $Z1_V$, which is energized in response to the delta line-voltage $E_{AB}$.

The second-zone mho-relay or modified-impedance relay M2A has an operating coil M2A which is energized in response to the delta line-current $I_{AB}$, and a restraint-coil $M2_V$ which is energized from a mixing transformer 12 having two primary windings 13 and 14, one of which is energized in response to the delta line-current $I_{AB}$, and the other of which is energized, through a suitable phase-shifter such as a reactor 15, from the delta line-voltage $E_{AB}$.

The third-zone mho-relay or modified-impedance relay M3A has an operating coil M3A which is energized in response to the delta line-current $I_{AB}$, and a restraint-coil $M3_V$ which is energized from a mixing transformer 12' which is similar to the mixing transformer 12 except that the polarity of the voltage-responsive primary winding 14' is reversed.

In Fig. 1, the tripping circuits of the circuit-breaker 4 are indicated, in across-the-line diagram, from the negative relaying bus (—) to the positive relaying bus (+).

I have illustrated my invention with reference to the phase-fault-responsive tripping-circuits, and therefore I have not illustrated the ground-fault protection such as is usually or frequently provided.

The phase-fault tripping-circuits of Fig. 1 may be properly indicated by tracing out the connections for only one of the phases, such as the phase A. As shown in Fig. 1, a first phase-fault tripping-circuit is traceable from the negative bus (—), through the directional-contact DA, to a conductor 16, and thence through the first-zone impedance-relay contact Z1A to the tripping bus 17.

A second phase-A tripping-circuit is provided, under the control of the second-zone mho-relay contact M2A, which is illustrated as being connected between the conductor 16 and a conductor 18, from which a circuit continues, through either the receiver-relay contact RR or the second-zone timer-contact T2A, to the tripping bus 17. The conductor 18 also energizes an auxiliary phase-A contactor-switch CSA, which has a make-contact CSA which energizes a phase-A timer TA. The timer TA is energized from a saturated transformer ST, the alternating-current connections of which are shown in the relaying panel 5, where this transformer is shown as being energized from the delta line-current $I_{AB}$.

The receiver-relay contact RR, in the phase-A tripping-circuit just described, is a means for affording an indication, at the illustrated relaying terminal or station, that the similar relaying equipment at the far-end terminal of the protected line-section has made an internal-fault determination so that it is feasible to utilize this relay-contact RR to obtain quick or immediate tripping in response to a second-zone relay M2A which reaches or responds to faults beyond the far-end terminal of the protected line-section, since the relay-contact RR limits the response to faults which are no further away than the far-end terminal.

The receiver-relay contact RR, in the tripping circuit, while actually a part of a carrier-current system which will be subsequently described, may also be taken, in some of the broader aspects of my invention, as being representative of any suitable means for indicating, at the relaying terminal, that there has been an internal-fault determination at the far-end terminal of the protected line-section. There are other means known, other than the receiver-relay RR, for affording such a far-end internal-fault determination, for giving the go-ahead signal to a relay (such as M2A) which is uncertain in its determination of the location of a fault on the protected transmission-system, responding to faults which are both closer and farther away than the far-end line-terminal.

The receiver-relay RR, in the form of embodiment of my invention which is illustrated in Fig. 1, is a part of a carrier-current system including a transmitter 20, which is represented by a simple oscillator-tube OSC, and a receiver 21 which is represented by a simple receiver-tube REC. The carrier-current transmitter-receiver equipment 20—21 is connected to a coupling transformer 22, which is coupled to the phase-C line-conductor through a coupling-capacitor 23, in a well-known manner.

The receiver-relay itself is provided with an operating coil RR, shown at the bottom of Fig. 1, and a restraining or holding-coil $RR_H$, shown associated with the receiver-equipment 21. As shown, the receiver-relay operating-coil RR is energized whenever any one of the three directionally responsive contactor-switches CSA, CSB or CSC is energized, these contactor-switches being directionally responsive by being responsive to the several directional elements DA, DB and DC, respectively. The receiver-relay holding-coil $RR_H$ is energized whenever carrier-current is transmitted from either end of the protected line-section.

In the system illustrated in Fig. 1, carrier-current transmission is initiated by applying a negative potential to the cathode-circuit 24 of the transmitter-oscillator OSC, in response to any one of the three third-zone mho-relay make-contacts M3A, M3B or M3C.

The operation of the various relay-elements, and of the entire relaying system which is shown in Fig. 1, will best be understood by reference to Fig. 2, which shows curves representing the pick-up points of the various elements, plotted in a diagram in which the coordinates are line-resistance and line-reactance, respectively.

In Fig. 2, the straight line D—D represents the pick-up point of the directional elements DA, DB and DC. It is a straight line passing through the origin in the second and fourth quadrants. The relay responds to impedances lying above and to the right of this line.

The locus of the pick-up points of the first-zone impedance elements Z1A, Z1B and Z1C is shown by the circle Z1 in Fig. 2. This is a circle having a center at the origin, and having a radius corresponding to a length which is something like 80% of the total line-impedance between the relaying terminal and the far-end terminal of the protected line-section.

In Fig. 2, the line F is the locus of the line-impedance for faults up to points at various distances from the relaying terminal, and the dotted-line F' represents the fault-impedance, including fault-resistance, drawn for internal faults or faults accompanied by an internal or into-the-line direction of fault-current. These are lines lying in the first quadrant at an angle close to 90° with respect to the R-axis.

The locus of the pick-up points of the second-zone mho-elements M2A, M2B and M2C is indicated in Fig. 2, by either the smaller dotted-line circle M2 or the larger full-line circle M'2, both circles having the same maximum-distance response $a$, the larger circle passing through the origin, and the smaller circle falling short of the origin, both circles M2 and M'2 having their centers in, or near, the internal-fault line-impedance line F, and displaced by a considerable distance from the origin.

In Fig. 2, the locus of the pick-up points of the third-zone mho-relays M3A, M3B and M3C is shown by the circle M3, which has its center in the third quadrant, in or near the line-impedance line F (extended), corresponding to external-fault conditions, and having a radius such that the circle passes through or near the origin.

The locations of the centers, and the lengths of radius, of the mho-element circles M2, M'2 and M3 may be controlled by a proper choice of the relative magnitudes of the current-responsive excitations on the operating and restraining coils respectively, the relative magnitudes of the current-responsive and voltage-responsive excitations on the restraining windings, and the relative phase-shift displacement between current and voltage on the restraining windings. These adjustments, together with certain more specific details of adjustment, constitute the subject-matter of a continuation-in-part application, Serial No. 547,561, filed August 1, 1944, for Relays.

Thus, a characteristic of the type shown in the full-line second-zone circle M'2 of Fig. 2 is obtained when the current-responsive pulls on the operating and restraining coils of the relays are equal to each other, and when the relay-voltage leads the delta line-voltage $E_{AB}$ by 100°, which is obtained by reversing the voltage-response and lagging it 80°, with a series reactor 15 (Fig. 1). The third-zone response, of the circle M3 in Fig. 2, with a center in the third quadrant rather than in the first quadrant, is an element similar to the element having the M'2 response, except that the polarity is reversed, referring to the relative polarity of the voltage-responsive and current-responsive excitations which are combined in the mixing transformer 12'. The dotted-line second-zone circle M2 in Fig. 2 is obtained by making the current-responsive pull on the operating side smaller than the current-responsive pull on the restraining side of the relay. The radii of the circles M2 and M3 are adjusted by proper selection of the relative magnitudes of the current and voltage-responsive excitations which are applied to the restraining windings of the relays.

It will be observed, from Fig. 2, that the first- and second-zone circles Z1 and either M2 or M'2 are overlapping circles, having centers at different points, and having radii such that the circles overlap each other. The corresponding relays Z1 and M2 are utilized, as shown in Fig. 1, to provide both instantaneous tripping and carrier-current control. I believe that this is the first time that modified impedance relays having over-lapping-circle characteristics have been applied to either one of these functions.

The first-zone impedance-responsive tripping-operation, as shown in Fig. 1, is under the control of the directional element D and the first-zone impedance-element Z1. In Fig. 2, this tripping-area is included in the top half of the Z1-circle, using the line D—D as a diameter, or the area $b$—$c$—$d$—$e$—$f$—$g$—$h$.

The tripping operation in response to the second-zone impedance-element M2 is responsive to any impedance lying within the dotted-line circle M2 in Fig. 2, except for the arcuate area $d$—$e$—$f$ which is cut off by the overlapping first-zone circle Z1. The instantaneous tripping area does not actually occupy all of the circle M2, out to the most remote point $a$, because the receiver-relay RR limits the instantaneous response to faults which are closer than the far-end terminal of the protected line-section, whereas the point $a$ reaches out beyond said far-end terminal.

If the larger second-zone impedance-circle M'2 had been utilized, in Fig. 2, the point $f$ would have been moved out to $g$, on synchronizing swings in which the phase-angle between the generated electromotive forces of the synchronous machines (not shown) at the two ends of the protected line-section will have become abnormally large, and the point $d$ would have been moved out at $c$, on synchronizing swings in which the phase-angle between the two ends of the line had reversed, indicating a reversal of power-flow. The points $f$ and $d$ represent synchronizing swings to larger phase-angles than the points $g$ and $c$, respectively, and hence it is frequently advantageous, particularly on long lines where the synchronizing swings may be quite severe, without loss of synchronism, to utilize a second-zone element having a characteristic which is represented by the smaller dotted-line circle M2 in Fig. 2, rather than the larger full-line circle M'2. The difference between these two circles provides additional synchronizing power, in the shaded areas S and S' of Fig. 2, in the critical area where the two ends of the line have swung apart during the time necessary to clear an external fault, and where an instantaneous tripping operation is highly undesirable, because the line is still able to recover synchronism.

In the carrier-current control, the overlapping circles Z1 and M2, in Fig. 2, are utilized in series with the straight-line directional-control D—D, to control the carrier-current receiver-relay RR, through the auxiliary contactor-switches CSA, CSB and CSC, which are energized from the directional relays D and the second-zone relays M2. Since an independent instantaneous tripping operation is also made in response to the directional element D and the first-zone element Z1, as already described, this leaves the area d—a—f—e as the effective area which defines the impedance-conditions under which second-zone tripping-operation may be obtained as a result of an opening of the back contacts of any one of the relays CSA, CSP and CSC which shunt the receiver-relay operating-coil RR at the bottom of Fig. 1.

The initiation of carrier-current transmission, in my novel relaying-system as shown in Fig. 1, is unusual in being responsive solely to the third-zone modified-impedance elements M3A, M3B and M3C, which have directional responsivity, as shown by the M3 circle in Fig. 2. It will be noted that the M3 circle is almost altogether on the underside of the directional-response line D—D, which responds to conditions in which the fault-current is flowing back, out of the protected line-section, and through the bus 3 at the relaying terminal, back to some point further back in the transmission system. Thus I do not first start carrier, in response to a sensitive fault-detector which is not sufficiently responsive directionally, and then remove the carrier through a suitable directional response, as in the common carrier-current relaying-system which was in vogue prior to my present invention, nor do I start the carrier-current transmission under all impedance-conditions line below and to the left of the directional-response line D—D, as in one of the earliest proposals for carrier-current control, but I limit the area, representing the conditions under which carrier-current transmission is initiated, by utilizing a modified-impedance relay having a response-characteristic which is a finite-radius circle such as M3, having any desired area, and lying altogether or substantially altogether on the underside of the directional-responsive line D—D.

It will thus be seen that my Fig. 1 relaying system, by utilizing modified-impedance relays, represented by circles having displaced centers, displaced from the origin of the resistance-reactance coordinates, limits the fault-response to the area immediately surrounding the fault-lines F and F' in Fig. 2, so that undesired tripping-operations are avoided in the largest manner possible.

While I have illustrated only two overlapping circles Z1 and M2, in Fig. 2, having centers at different points along the internal-fault impedance-line F, or near that line, it will be obvious that I am not limited to only two of these circles, but three, or four, or more overlapping circles, of smaller diameters, might have been utilized, to build up an elongated instantaneous-tripping area h—g—f—a—d—c—b which approaches as closely as may be desired to the area between and surrounding the lines F and F' in Fig. 2, elongated in the direction of the most distant internal-direction fault a, as compared to previous systems.

One of the general new features of my invention, which has to do with the use of a plurality of modified impedance units having overlapping circles, is its adaptability to many uses in promoting the flexibility of design of many different protective relaying systems. Another illustration is given in the relaying system which is shown in Fig. 3, the impedance-circle diagram of which is indicated in Fig. 4. In Fig. 2, for example, the non-overlapping portions of the impedance-circles were utilized to outline the confines of the elongated impedance-area to which the relays responded, and a response to the two impedance-units corresponding to these circles was obtained when either the one or the other unit responded. In Fig. 4, however, the elongated area which embraces the range of fault-current impedances is the overlapping portion of two impedance-circles, or of three or more impedance-circles, and the response, which is confined to this area, is a joint simultaneous response of both of the corresponding impedance units, or of all three or more of the units, if more than two overlapping impedance-circles are involved.

In Fig. 4, the possible range of the fault-current impedance, with a little surrounding area for a factor of safety, is confined by the overlapping portions of two large, finite-radius impedance-circles marked X1 and X2. These circles are chosen with such characteristics that their overlapping portion provides good coverage in the direction of the internal-fault impedance, as indicated by the fault-impedance lines F and F', and also coverage for external faults, in which the F and F' arrows are reversed, so as to lie in the third quadrant rather than the first, while excluding responses in the range of impedance corresponding to load-current and synchronizing surges. I have chosen the Fig. 4 illustration for a case in which it is desired to have the relay reach out further, to a greater distance, as indicated at m, for internal faults, or faults having an into-the-line current-direction, than for external faults, as indicated by the lower intercept n, but it will be understood that the relays might have been arranged, if desired, to have a longer reach, or distance-range of response, in the lower area which is underneath and to the left of the direction-responsive line D—D.

In general, the response to faults which are accompanied by an external direction of current is utilized to superimpose the carrier current on the protected line-section, so as to block a tripping operation which involves the receiver relay RR at the other end of the line-section, and since the tripping contacts of that receiver relay at the far end are in series with internal-fault distance-responsive relays which have to reach out beyond the total line-impedance of the protected line-section, the reach of the response to internal faults should in general be further out, than the reach of the response to external faults, by approximately the impedance of the protected line-section, between the two terminals thereof. As I have indicated, however, I am obviously not limited to this particular illustrated form of design, in the type of relay which is depicted in Fig. 4.

If first-zone instantaneous tripping operation, without the supervision of carrier, is desired, in the relaying system of Fig. 4, it can be provided by the addition of a first-zone impedance-relay which is indicated by the impedance-circle ZI as in Fig. 2. In Fig. 4, however, the alternative is presented, of either utilizing the joint response of the directional and first-zone impedance-elements D and ZI to define the first-zone tripping area, as in Fig. 2, where this area was b—c—d—e—f—g—h, or this first-zone instantaneous tripping area may be still further confined to a joint response of the two overlapping modified-impedance circles XI and X2, in addition to the responses to D—D and ZI, thus limiting the first-zone impedance-response, without carrier, to the area p—q—w—r—s, in Fig. 4.

The diagram for the relaying system corresponding to Fig. 4 is shown in Fig. 3 where the same conventions are utilized as in Fig. 1, the three phase-fault relaying panels being shown at 5', 6' and 7' in Fig. 3.

In Fig. 3, I have illustrated a different form of modified-impedance relay than in Fig. 1, by way of emphasizing the fact that I am not limited to any particular type of relay-element or unit which has the characteristic finite-radius circle-response with the center of the circle displaced from the origin, on the impedance-circle diagram such as Fig. 2 or Fig. 4. The form of modified-impedance element which is indicated in Fig. 3 is a modified reactance-element of the type shown in the Lewis Patent 1,967,093, in which the operating force is responsive to the vectorial sum of a voltage and a current, with any desired phase-displacement between them, while the restraining force is responsive to voltage alone. A still further modification would be to have the joint voltage and current response effective on both the operating and restraining ends of the relay, as covered in my aforesaid copending application. The same effect can also be obtained by the combination of operating and restraining rotational torques, and the forces can be obtained wattmetrically or dynamically, as well as by means of electromagnet pulls.

In Fig. 3, the operating coils X1A and X2A of the two modified-impedance or modified-reactance relays X1A and X2A are excited from mixing transformers 32 and 32', the primary windings of which include current-excited windings 33 and voltage-excited windings 34, the latter being excited, through phase-shifting impedances 35, in response to the delta-line voltage $E_{AB}$. In this case, the phase-shifter 35 is illustrated as a resistance and a capacity in series, although other phase-shifting combinations may be utilized, as will be well understood. The restraint-windings of the first-zone impedance-element Z1A and the two modified-impedance elements X1A and X2A are indicated at $Z1_v$, $X1_v$ and $X2_v$, respectively, all three of these restraint-windings being energized in response to the delta line-voltage $E_{AB}$.

In the direct-current control-circuits of Fig. 3, it will be noted that the phase-A tripping-circuit extends from the negative bus (—) through the directional contact DA to a conductor 36, and thence through the contacts of the two modified-impedance elements X1A and X2A to a conductor 37, at which point the tripping circuit divides into three branches, namely, a first-zone instantaneous-tripping branch including the first-zone impedance-contact Z1A, and thence extending on to the tripping conductor or bus 38, the second branch being a carrier-supervised instantaneous-tripping circuit including the receiver-relay contact RR, and the third branch being a time-delayed or backup tripping-circuit including the second-zone contact T2A of the timer TA. The conductor 37 is also utilized to control the auxiliary relay CSA, which in turn controls both the timer TA and the carrier-current control-circuits.

It will be noted that the first-zone tripping-operation, without carrier-current supervision, in Fig. 3, is thus responsive to a joint response of all three of the impedance relays X1A, X2A and Z1A, in addition to the directional element DA, thus providing a response to the restricted area p—q—w—r—s in Fig. 4. If desired, however, the first-zone tripping-contact Z1A could have been connected between the conductors 36 and 38, instead of between the conductors 37 and 38, thus providing a response to only the two units DA and Z1A, as indicated by the larger area t—q—w—r—u in Fig. 4.

The carrier-transmitter control-circuits in Fig. 3 utilize a joint-response of the two modified-impedance relays in any phase, such as the phase-A relays X1A and X2A, or the phase-B relays X1B and X2B, or the phase-C relays X1C and X2C, to energize a conductor 39 from the negative bus (—), after which the carrier-controlling circuit continues, through the auxiliary-relay back-contacts CSA, CSB and CSC, to the cathode lead 40 of the transmitter-oscillator OSC. The receiver-relay operating-coil RR is also connected in a parallel circuit extending between the conductors 39 and 40, so that it is energized whenever any one of the directionally responsive back-contacts CSA, CSB or CSC opens.

In the operation of the relaying system shown in Fig. 3, carrier-current transmission is started by the joint-response of the two modified-impedance elements X1 and X2 covering the impedance-area n—p—q—m—r—s of Fig. 4, and carrier-transmission at the relaying terminal is interrupted by the auxiliary contactor-switch CSA, CSB, or CSC, when the fault-impedance lies within the area p—q—m—r—s of Fig. 4. Otherwise the operation is similar to that which has been described for Fig. 1, and no further explanation is believed to be necessary.

While I have more particularly described my invention with relation to phase-fault relays, I wish it to be understood that the modified-circuit diagrams of Figs. 2 and 4 are applicable to all kinds of distance-relays, whether their energizing currents and voltages are chosen for phase-fault responses or for ground-fault responses.

In Fig. 5 I have shown a manner in which preference may be given to conventional ground-fault relays, while utilizing my modified reactance type of relays for the phase-fault relays. In Fig. 5, the same relays are shown as in Fig. 1, with some additions. I have added a ground-fault relaying panel 50 containing a ground-directional relay DO, and second and third-zone ground-overcurrent relays IO2 and IO3, the latter being more sensitive. The current-coils of these relays are energized in the residual-current circuit of the line-current transformers 10. The ground-directional relay DO is provided with voltage-responsive polarizing windings $D_{vo}$, which are illustrated as being energized from the zero-sequence voltage-component which is obtained from auxiliary transformers 51 which are energized from the potential transformers 11.

The phase-fault tripping-circuits of Fig. 5 are as shown in Fig. 1, except that the busses 18 of the three second-zone phase-fault tripping-circuits are connected together into a common bus 18'. The coils of the three auxiliary contactor-switches CSA, CSB and CSC are all energized from this common relaying bus 18', being rendered selective for the particular phase which is faulted, by having back-contacts of the respective second-zone elements M2A, M2B and M2C connected around them, so that the contactor-switch coils are all short-circuited, except in the phase which is faulted.

In addition, in Fig. 5, I have added an additional phase-fault contactor-switch CSP, having an operating coil which is energized from the common second-zone relaying bus 18', so as to be energized in response to an internal-direction fault within the reach of the second-zone element in any one of the three phases A, B and C.

In Fig. 5, I have also added a ground-fault tripping circuit 52 which is traceable from the negative bus (—) through the ground-directional contacts DO and the insensitive ground-overcurrent contacts IO2, to a conductor 53, and thence through a contact 54 of the receiver relay RR, to the tripping bus 17. I have also shown an auxiliary ground-fault contactor CSG, the coil of which is energized from the conductor 53.

The carrier-controlling circuits of Fig. 5 are designed to provide what is known as ground-preference, which is to say that if the ground-fault relays respond, they take control of the carrier-current transmission and stoppage, regardless of the performance of the phase-fault relays. In order to accomplish this ground-preference carrier-current control, without requiring extra contacts on delicate relay-elements, while still utilizing the directionally responsive third-zone phase-fault detectors M3A, M3B and M3C, it has been necessary to modify the usual ground-preference carrier-controlling connections.

As shown in Fig. 5, the three parallel-connected make-contacts of the third-zone phase-fault elements M3A, M3B and M3C are also paralleled by a make-contact of the CSP relay, so that these four contacts connect a relaying bus 55 to the negative terminal (—), whenever any one of said four elements responds. A back-contact of the CSP relay connects the circuit 55 to a circuit 56, and a back-contact of the CSG relay connects the circuit 56 to the cathode-terminal 57 of the oscillator OSC in the transmitter 20. The operating coil RR of the receiver relay RR is connected in a circuit 58 which is in parallel across the conductors 55 and 57, so that the coil RR is normally short-circuited by the back-contacts of the CSP and CSG relays. The sensitive ground overcurrent relay IO³ has a make-contact which is connected between the negative bus (—) and the relaying conductor 56.

Except as just described, the carrier-controlling circuits of Fig. 5 are the same as in Fig. 1. The connections for controlling carrier-current starting and stopping, and for energizing the operating coil RR of the receiver relay RR, in Fig. 5, are the conventional ground-preference carrier-current connections, except for the use of the four parallel-connected make-contacts M3A, M3B, M3C and CSP. The third-zone elements M3A, M3B and M3C respond only, or preferentially, to external faults. The CSP relay responds only in the event of a phase-fault which is accompanied by an internal current-direction, and hence it does not, in general, respond at any time when any one of the third-zone elements M3A, M3B or M3C responds, or vice versa. The CSP relay has no effect upon the carrier-controlling circuit, because the presence of the CSP make-contact makes the relay powerless to start carrier-current transmission, and the use of directionally responsive carrier-starting elements M3A, M3B and M3C makes it impossible to start carrier-current transmission at any time when the CSP relay could respond, assuming that the response-circle of the M3 elements does not reach over into the first quadrant of the response-circle diagram such as that shown in Fig. 2.

In the event of a ground fault, however, the non-directional ground-fault detector IO3 initiates carrier current transmission, and subsequently the more slowly operating ground-fault contactor-switch CSG responds, in the event of an internal ground-fault direction, to stop carrier-current transmission, and it will be noted that it does this regardless of any phase-fault response or lack of response.

At the same time that carrier is removed from the relaying end of the protected line-section 1, it is necessary to energize the operating coil RR of the receiver relay, and in order to accomplish this without requiring extra contacts for the purpose, it has been customary to connect the operating coil RR across the two serially connected back-contacts of the CSP and CSG relays, as shown in Fig. 5. In previous systems, however, sensitive non-directional phase-fault carrier-current starters have been utilized, these non-directional phase-fault starters being more sensitive than the directionally responsive element CSP, so that the CSP element could never operate, so as to stop carrier by opening its back-contact, unless the phase-fault carrier-starting elements had also responded.

In the present system, however, I utilize directional phase-fault carrier-current starters M3A, M3B and M3C, which are connected to the relaying bus 55, and these elements, in general, will never respond if the CSP element responds. Hence, if the CSP element should respond, at a time when there is a ground-fault, so that ground-preference is desired, the relaying bus 55 could not, in general, be connected to the negative bus (—) by any one of the three phase-fault third-zone elements M3A, M3B or M3C, and hence I have provided the CSP make-contact, which is also connected between the relaying bus 55 and the negative bus (—). This make-contact is designed to close these contacts after the back-contacts of the same CSP relay have opened, so as to make sure not to accidentally momentarily energize the carrier-current transmission while the CSP contacts are moving.

In the manner just described, I provide an energizing circuit for the receiver-relay operating-coil RR, during ground-fault conditions. Thus, if the CSP relay has not responded, an energizing circuit for the coil RR is traceable from the negative bus (—), through the IO3 contact, the conductor 56, the CSP back-contact, the conductor 55, the circuit 58 containing the RR coil, the circuit 57, and the resistor 59, to the positive bus (+). On the other hand, if the CSP relay has responded, a receiver-relay energizing-circuit is traceable from the negative bus (—) through the CSP make-contact to the conductor 55, and from thence as previously traced.

While I have illustrated my invention in only three illustrative forms, I wish it to be understood that the invention is susceptible of many variant forms of embodiment, and I desire that the appended claims shall be accorded the broadest construction consistent with their language.

I claim as my invention:

1. Terminal protective equipment for protecting a terminal of an alternating-current line-section, comprising the combination, with a line-segregating circuit-interrupting means at that terminal of the line-section, of line-segregating control-means for effecting a line-segregating operation of said circuit-interrupting means, and line-fault-responsive relaying-means for responding selectively to a range of line-impedances in the vicinity of the area of the line-fault impedances, said relaying-means being including in the control of said line-segregating control-means, and said relaying-means being characterized by including a plurality of line-fault-responsive elements having overlapping, finite-radius, response-circles when plotted on an impedance diagram representing line-reactance plotted against line-resistance, said overlapping circles jointly bounding a limited response-area which is elongated in the direction of the furthest line-fault impedance.

2. The invention as defined in claim 1, characterized by one or more of said overlapping circles being a circle having a center lying in the vicinity of the internal-fault impedance-area of the protected line-section, and displaced considerably from the origin, at least some of the non-overlapping portions of said circles being included in the boundaries of the joint response-area of said line-fault-responsive relaying-means.

3. The invention as defined in claim 1, characterized by said elongated response-area being within the overlapping area of the response-circles of two of said line-fault-responsive elements.

4. The invention as defined in claim 1, characterized by said elongated response-area extending out, in the internal-fault direction of the line-impedance, further than the impedance corresponding to the length of the protected line-section.

5. The invention as defined in claim 1, characterized by said elongated response-area extending out, in the internal-fault direction of the line-impedance, further than the impedance corresponding to the length of the protected line-section, and said relaying-means also including a first-zone distance-responsive element for segregating that portion of said elongated response-area which is readily distinguishable as corresponding to faults which are closer than the far-end terminal of the protected line-section.

6. The invention as defined in claim 1, characterized by said elongated response-area being within the overlapping area of the response-circles of two of said line-fault-responsive elements, in combination with a first-zone distance-responsive element for segregating that portion of said elongated response-area which is readily distinguishable as corresponding to faults which are closer than the far-end terminal of the protected line-section.

7. Terminal protective equipment for protecting a terminal of an alternating-current line-section, comprising the combination, with a line-segregating circuit-interrupting means at that terminal of the line-section, of line-segregating control-means for effecting a line-segregating operation of said circuit-interrupting means, and line-fault-responsive relaying-means for responding selectively to a range of line-impedances in the vicinity of the area of the line-fault impedances, said relaying-means being included in the control of said line-segregating control-means, and said relaying-means being characterized by including an external-fault line-fault-responsive element having a finite-radius response-circle when plotted on an impedance-diagram representing line-reactance plotted against line-resistance, said circle having a center lying in the vicinity of the external-fault impedance-area and displaced considerably from the origin in a direction opposite to the direction of the internal line-fault impedances.

8. Terminal protective equipment for protecting a terminal of an alternating-current line-section, comprising the combination, with a line-segregating circuit-interrupting means at that terminal of the line section, of line-segregating control-means for effecting a line-segregating operation of said circuit-interrupting means, and line-fault-responsive relaying-means for responding selectively to a range of line-impedances in the vicinity of the area of the line-fault impedances, said relaying-means being included in the control of said line-segregating control-means, and said relaying-means being characterized by including an internal-fault distance-responsive means having a response-area extending out further than the impedance corresponding to the length of the protected line-section, an external-fault line-fault-responsive element having a finite-radius response-circle when plotted on an impedance-diagram representing line-reactance plotted against line-resistance, said circle having a center lying in the vicinity of the external-fault impedance-area and displaced considerably from the origin in a direction opposite to the direction of the internal-line-fault impedances, means for sending an indication to the far end of the protected line-section in response to said external-fault element at the relaying terminal, and means for receiving a similar indication from the far-end terminal of the protected line-section.

9. Terminal protective equipment for protecting a terminal of a polyphase line-section, comprising the combination, with a line-segregating circuit-interrupting means at that terminal of the line-section, of: signal-means for at times transmitting a signal from the relaying terminal to the far-end terminal of the protected line-section; a receiver-relay having a restraint means which is responsive to a signal transmitted from said far-end terminal, said receiver-relay also having an operating-coil; means for effecting a line-segregating operation of said circuit-interrupting means in response to responses including a response of said receiver-relay; a preferred detector-means having a make-contact, responsive to line-faults of a preferred kind; a preferred internal-direction-responsive relay-means having back-contact-means, responsive to line-faults of said preferred kind; an external-direction-responsive non-preferred detector-means having a make-contact, responsive to line-faults of a non-preferred kind; a non-preferred internal-direction-responsive relay-means having both a make-contact and a back-contact, responsive to line-faults of said non-preferred kind; a signal-controlling circuit adapted, when closed, to cause signal-transmission, and adapted, when opened, to prevent signal-transmission from said relaying terminal, said signal-controlling circuit serially including said non-preferred detector make-contact and a preferred internal-direction-responsive back-contact; a shunting circuit, serially including a preferred internal-direction-responsive back-contact and the non-preferred internal-direction-responsive back-contact, and connected in shunt around the receiver-relay operating-coil, whereby the excitation of said operating-coil is under the control of either one of said internal-direction-responsive back-contacts; means including said preferred detector make-contact for providing a shunt-circuit around said non-preferred detector make-contact, whereby said preferred detector make-contact is able to cause signal-transmission independently of said non-preferred detector make-contact; and a shunting circuit, serially including both the make and back-contacts of said non-preferred internal-direction-responsive relay-means, and connected in shunt around the aforesaid preferred detector make-contact, whereby said preferred detector make-contact may be able to prevent the non-preferred internal-direction-responsive back-contact from exciting the receiver-relay operating-coil, and whereby an energizing-circuit is made available for the receiver-relay operating-coil regardless of the response or lack of response of the non-preferred internal-direction-responsive relay-means.

10. Terminal protective equipment for protecting a terminal of a polyphase line-section, comprising the combination, with a line-segregating circuit-interrupting means at that terminal of the line-section, of: signal-means for at times transmitting a signal from the relaying terminal to the far-end terminal of the protected line-section; a receiver-relay having a restraint means which is responsive to a signal transmitted from said far-end terminal, said receiver-relay also having an operating-coil; means for effecting a line-segregating operation of said circuit-interrupting means in response to responses including a response of said receiver-relay; a preferred detector-means having a make-contact, responsive to line-faults of a preferred kind; a preferred internal-direction-responsive relay-means having a back contact, responsive to line-faults of said preferred kind; an external-direction-responsive non-preferred detector-means having a make-contact, responsive to line-faults of a non-preferred kind; a non-preferred internal-direction-responsive relay-means having both a make-contact and a back-contact, responsive to line faults of said non-preferred kind; a signal-controlling circuit adapted, when closed, to cause signal-transmission, and adapted, when opened, to prevent signal-transmission from said relaying terminal, said signal-controlling circuit serially including said non-preferred detector make-contact, said non-preferred internal-direction-responsive back-contact, and said preferred internal-direction-responsive back-contact; a shunting circuit, serially including the aforesaid preferred internal-direction-responsive back-contact and the aforesaid non-preferred internal-direction-responsive back-contact, and connected in shunt around the receiver-relay operating-coil, whereby the excitation of said operating-coil is under the control of either one of said internal-direction-responsive back-contacts; a shunting circuit, including said preferred detector make-contact, and connected in shunt around said serially connected non-preferred detector make-contact and said non-preferred internal-direction-responsive back-contact, whereby said preferred detector make-contact is able to cause signal-transmission when said non-preferred detector make-contact is open; and a shunting circuit, including said non-preferred internal-direction-responsive make-contact, and connected in shunt around said non-preferred detector make-contact, whereby an energizing-circuit is made available for the receiver-relay operating-coil regardless of the response or lack of response of the non-preferred internal-direction-responsive relay-means.

SHIRLEY L. GOLDSBOROUGH.